Nov. 3, 1942.     D. A. FLORENCE     2,300,915
FLASHLIGHT STAND OR THE LIKE
Filed Oct. 25, 1940
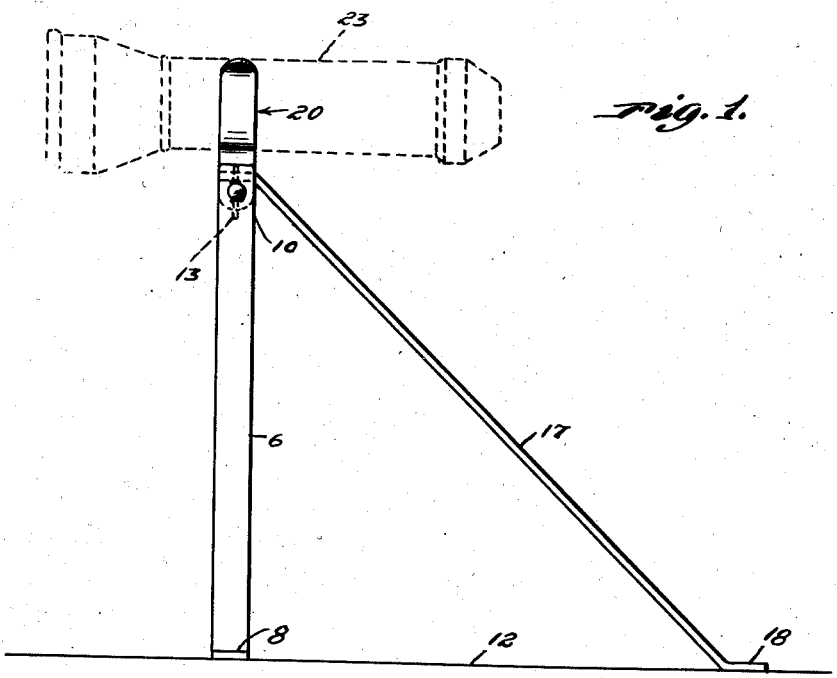
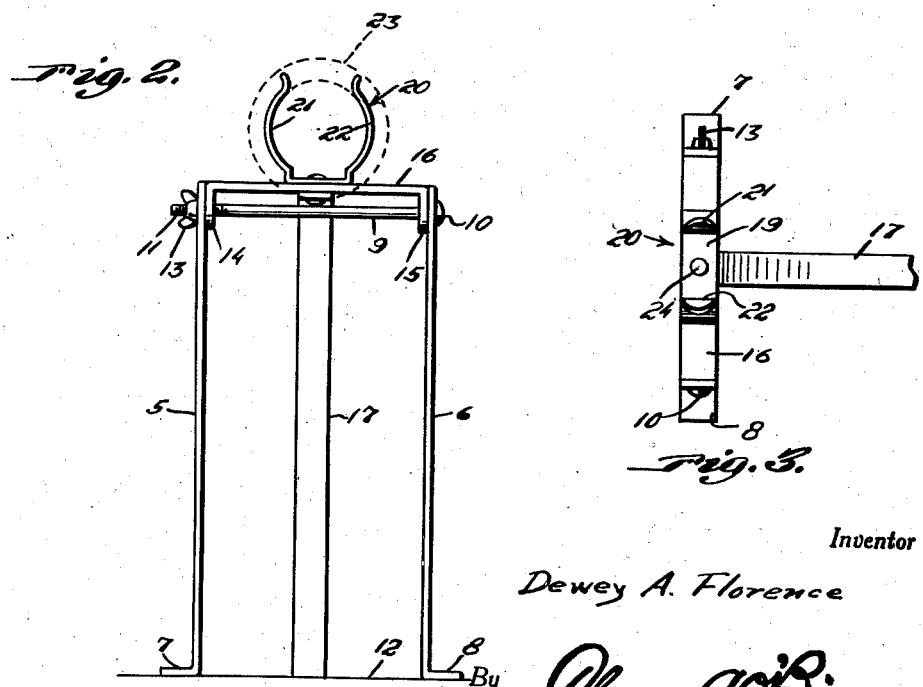
Inventor
Dewey A. Florence
By Clarence A. O'Brien
Attorney Patented Nov. 3, 1942

2,300,915

UNITED STATES PATENT OFFICE 2,300,915

FLASHLIGHT STAND OR THE LIKE

Dewey A. Florence, Philadelphia, Pa.

Application October 25, 1940, Serial No. 362,860

4 Claims. (Cl. 248—168)

My invention relates to improvements in means for supporting flashlights and similar objects in adjusted position relative to a supporting surface, and the primary object of the invention is to provide a simple and efficient arrangement of this character which can be provided in a sturdy and attractive form at relatively low cost.

Other important objects and advantages of my invention will be apparent from a reading of the following description taken in connection with the appended drawing, wherein for purposes of illustration I have shown a preferred embodiment of my invention.

In the drawing:

Figure 1 is a general side elevational view of the device showing a flashlight in position thereon in phantom lines.

Figure 2 is a left hand end elevational view of Figure 1.

Figure 3 is a fragmentary top plan view of Figure 1 with the flashlight removed.

Referring in detail to the drawing, the numerals 5 and 6 refer to similar but reversed uprights consisting of flat metal bars having laterally outwardly bent feet 7, 8, respectvely, at their lower ends for resting on the supporting surface 12, such as the ground alongside of an automobile when changing tires in the dark, or other desired support. The upper ends of the elements 5 and 6 are traversed by a bolt 9 having a head 10 bearing against the outer side of the element 6 and having a threaded portion 11 passing through an accommodating opening formed in the upper end of the element 5. On the threaded end 11 of the bolt is a wing nut 13 which is adapted to be turned to clamp the upper ends of the standards 5 and 6 against the outer sides of depending ears 14, 15, formed by bending down the opposite ends of a flat horizontal bar 16, whereby the bar 16 is clamped between and relative to the elements 5 and 6, and in a desired position of rotation on the axis of the bolt 9.

An acutely angulated rearwardly extending bar 17 has a foot 18 defined by bending the end of the bar into a horizontal position to engage the supporting surface 12, while the upper end of the bar 17 is similarly bent in an opposite direction to underlie and engage the bottom of the horizontal bar 16 approximately midway between its ends.

Resting on the top of the horizontal bar 16 over the bar 17 is the bight portion 19 of the flashlight holder which is generally designated 20 and which comprises oppositely curved spring arms 21 and 22 between which the flashlight 23 is clampably held as indicated in Figures 1 and 2. A rivet or other suitable fastener 24 traverses the bight portion 19 of the flashlight holder, the horizontal bar 16, and the adjacent portion of the bar 17 to secure these bars together in the stated relationships.

In using the device, the flashlight may be conveniently inserted in the holder 20, the feet 7 and 8 of the elements 5 and 6 then placed on the ground or other supporting surface, and the wing nut 13 loosened, and the foot 18 of the bar 17 then placed at the desired point to support the flashlight 23 at the desired angle, whereat the wing nut 13 is tightened to hold the flashlight in the selected position. It will be obvious that the described stand is equally useful for the supporting of truck flares or other signal devices, although it is especially devised for combination with the cylindrical type of flashlight.

Although I have shown and described herein a preferred embodiment of my invention, it is to be definitely understood that I do not wish to limit the application of the invention thereto except as may be required by the scope of the subjoined claims.

Having described the invention, what I claim as new is:

1. A stand for holding a flashlight or the like in a selected position of angulation with respect to a horizontal support, said stand comprising a pair of laterally spaced upstanding elements having their lower ends arranged to rest on said support, a horizontal member disposed between the upper parts of said elements, an angularly depressed leg secured to said horizontal member and extending therefrom to engage said support and contracting means for contracting the upper parts of said upstanding elements against the opposite ends of said horizontal member for securing said upstanding elements in a selected angular position relative to said legs.

2. A stand for holding a flashlight or the like in a selected position of angulation with respect to a horizontal support, said stand comprising a pair of laterally spaced upstanding elements having their lower ends arranged to rest on said support, a horizontal member disposed between the upper parts of said elements, an angularly depressed leg secured to said horizontal member and extending therefrom to engage said support and contracting means for contracting the upper parts of said upstanding elements against the opposite ends of said horizontal member for securing said upstanding elements in a selected angular position relative to said legs, said contracting means comprising a bolt traversing portions of said horizontal member and the said upper parts of said upstanding elements.

3. A stand for holding a flashlight or the like in a selected position of angulation with respect to a horizontal support, said stand comprising a pair of laterally spaced upstanding elements having their lower ends arranged to rest on said support, a horizontal member disposed between the upper parts of said elements, an angularly depressed leg secured to said horizontal member and extending therefrom to engage said support and contracting means for contracting the upper parts of said upstanding elements against the opposite ends of said horizontal member for securing said upstanding elements in a selected angular position relative to said legs, said contracting means comprising a bolt traversing portions of said horizontal member and the said upper parts of said upstanding elements, said portions of the horizontal member being arranged to turn on the axis of the bolt.

4. A stand for holding a flashlight or the like in a selected position of angulation with respect to a horizontal support, said stand comprising a pair of laterally spaced upstanding elements having their lower ends arranged to rest on said support, a horizontal member disposed between the upper parts of said elements, an angularly depressed leg secured to said horizontal member and extending therefrom to engage said support and contracting means for contracting the upper parts of said upstanding elements against the opposite ends of said horizontal member for securing said upstanding elements in a selected angular position relative to said legs, said contracting means comprising a bolt traversing portions of said horizontal member and the said upper parts of said upstanding elements, said portions of the horizontal member being arranged to turn on the axis of the bolt, said leg being rigidly secured to said horizontal member.

DEWEY A. FLORENCE.